United States Patent [19]
Kraus

[11] Patent Number: 5,947,426
[45] Date of Patent: Sep. 7, 1999

[54] PLASTIC HOLDING ELEMENT WITH FLEXIBLE CONNECTION BETWEEN ATTACHMENT AND HOLDING MEMBER

[75] Inventor: Willibald Kraus, Grunstadt, Germany

[73] Assignee: TRW United-Carr GmbH & Co. KG, Germany

[21] Appl. No.: 08/676,825

[22] Filed: Jul. 8, 1996

[30] Foreign Application Priority Data

Aug. 14, 1995 [DE] Germany .......................... 195 29 897

[51] Int. Cl.⁶ ................................................. F16L 3/08
[52] U.S. Cl. ...................... 248/74.2; 248/74.1; 248/68.1; 248/74.3
[58] Field of Search ................. 248/74.2, 74.1, 248/68.1, 74.3, 69, 67.5

[56] References Cited

U.S. PATENT DOCUMENTS

| | | | |
|---|---|---|---|
| 4,437,633 | 3/1984 | Andre | 248/68 R |
| 4,467,987 | 8/1984 | Small | 248/68.1 |
| 4,467,988 | 8/1984 | Kraus | 248/68.1 |
| 4,505,611 | 3/1985 | Nagashima et al. | 403/406 |
| 4,881,705 | 11/1989 | Kraus | 248/74.2 |
| 5,002,243 | 3/1991 | Kraus et al. | 248/68.1 |
| 5,016,336 | 5/1991 | Barnett et al. | 248/74.2 |
| 5,033,701 | 7/1991 | Kraus | 248/71 |
| 5,184,794 | 2/1993 | Saito | 248/68.1 |
| 5,271,587 | 12/1993 | Schätz et al. | 248/74.2 |
| 5,458,303 | 10/1995 | Ruckwardt | 248/74.2 |
| 5,460,342 | 10/1995 | Dove et al. | 248/74.2 |
| 5,535,969 | 7/1996 | Duffy, Jr. | 248/71 |
| 5,588,683 | 12/1996 | Schliessner | 248/74.2 |
| 5,651,634 | 7/1997 | Kraus | 403/408.1 |

FOREIGN PATENT DOCUMENTS

| | | |
|---|---|---|
| 0612944 | 8/1994 | European Pat. Off. . |
| 4334926 | 4/1995 | Germany . |

*Primary Examiner*—Derek J. Berger
*Assistant Examiner*—Kimberly T. Wood
*Attorney, Agent, or Firm*—Fay, Sharpe, Beall, Fagan, Minnich & McKee. LLP

[57] ABSTRACT

The invention relates to a holding element made of plastic, with at least one dish-shaped holding area 2, 2', 2" and 2''', for at least one tube-shape element, with an attachment area 3 with engagement parts 4 for fastening to a support, such as a body of a motor vehicle. According to the invention, the attachment area 3 is connected with a frame 6 by at least two elastic connection areas 5, 5', arranged at spaced axial distances from each other. The frame 6 includes cross-pieces with at least one of the cross-pieces of the frame constituting part of the holding areas.

27 Claims, 4 Drawing Sheets

PLASTIC HOLDING ELEMENT WITH FLEXIBLE CONNECTION BETWEEN ATTACHMENT AND HOLDING MEMBER

BACKGROUND OF THE INVENTION

The invention relates to a holding element made of plastic and having at least one dish-shaped holding area for at least one tube-shaped element, and with an attachment area with engagement parts for fastening to a support, such as a motor vehicle body.

Holding elements of this general type are already known as state of the art (see German patent 3002031C2; British patent 2,098,699A; or German patent 3330263A1). All these prior patents show single-piece holding elements made of plastic and having holding areas designed in the shape of a dish and being attachable via an attachment area to a support. A drawback with these known constructions is that they provide a relatively low degree of damping relative to vibrations and noises. This is particularly troublesome, especially in the area of motor vehicle technology.

Another drawback of the known holding elements is that frequently they provide inadequate tolerance compensation, since it is not always possible to achieve precise accuracy to gauge without expensive constructive expenditure particularly in mass production.

In order to improve the tolerance compensation, various constructions have already been proposed (see German patent 4334926A1 and U.S. Pat. No. 4,505,611), in which specifically formed elastic arms are used. It has further been proposed (German patent 3330263A1) to arrange diagonally extending wings in the interior of the attachment area diagonally extending wings in order to permit attaching the fastening element to a profile bolt while providing a certain tolerance compensation.

SUMMARY OF THE INVENTION

In contrast thereto, it is the task of the present invention to create a holding element of the initially mentioned type which gives an excellent damping effect and also contributes to a further improvement of tolerance compensation.

This task is solved according to the invention by having the attachment area connected to a frame by at least two flexible connection areas arranged at an axial distance from each other. At least one cross-piece of the frame of the holding element is part of a holding area. The connection areas can comprise, for example, at least two spirally extending elastic arms. Through interaction of these elastic arms, by means of which the attachment area is effectively connected with the various holding areas, there is produced, together with the cross-piece-like design of the frame, an excellent damping effect for the entire constructional unit. In addition, good tolerance compensation is obtained.

The construction of the holding areas is such that, by way of further refinement of the invention, they are also designed for acceptance of tube-shaped elements, for example cables or tubes, having different diameters.

Inasmuch as the spirally extending elastic arms (preferably three) at both fastening areas are respectively spaced far apart at an axial distance, there is produced significant improvement in the damping effect with added tolerance compensation. The cross-piece-shaped design of the frame, moreover, permits the several holding areas to be joined to the attachment area. The holding areas may have different shapes and may, for example, include pairs of holding cross-pieces or individual holding cross-pieces, arranged at a distance from each other, none of which are directly connected with the attachment area. Further there can be a number of recesses or openings in the frame, which results in further improvement of the damping effect.

BRIEF DESCRIPTION OF THE DRAWINGS

In the following, the invention is described in more detail by means of an exemplary embodiment represented in the drawing. The drawing shows the following:

FIG. 3 is a front elevational view of the

DETAILED DESCRIPTION OF THE PREFERRED EMBODIMENT

As is apparent from FIGS. 1 to 7, the holding element 1 is designed as a unitary, single-piece, molded plastic structure which, in essence, comprises an attachment area 3, which, in the present exemplary embodiment is connected with four holding areas 2, 2', 2" and 2'". The holding areas serve for receiving tube-shaped elements such as tubes, wire, and the like which may have various diameters. In addition, the attachment area 3 of the holding element 1 can include engagement parts 4, for direct or indirect attachment to a support such as a vehicle body.

Figure 1:
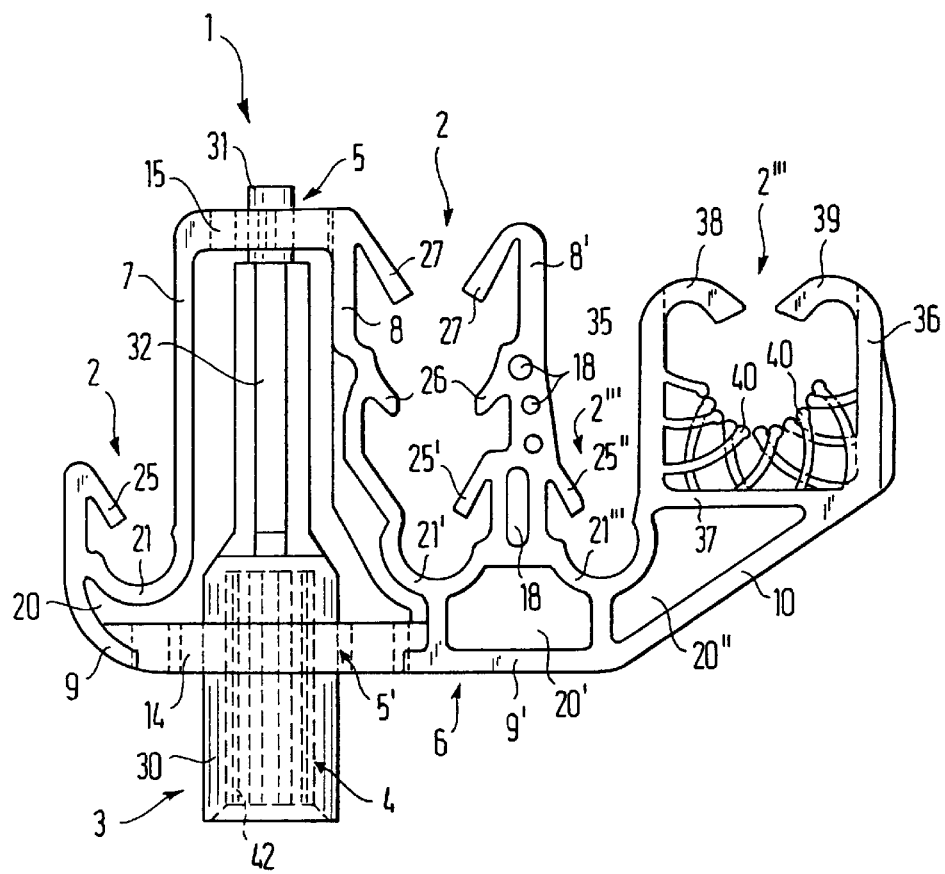
FIG. 1 is a side elevational view of the holding element according to the invention.
Figure 4:
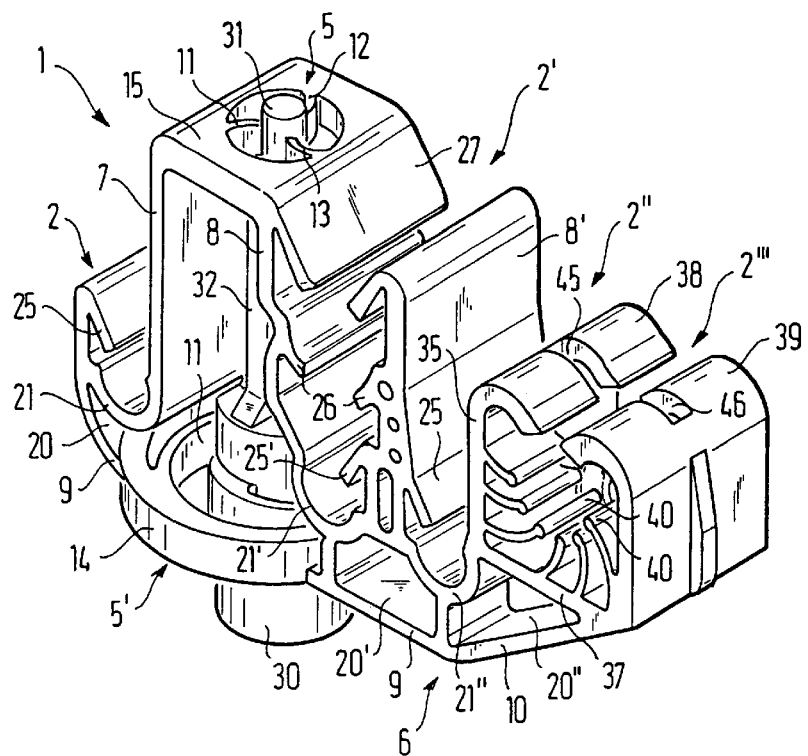
FIG. 4 is a perspective representation of the holding element of FIG. 1 showing a first side and taken from the top and back of the holding element.
Figure 5:
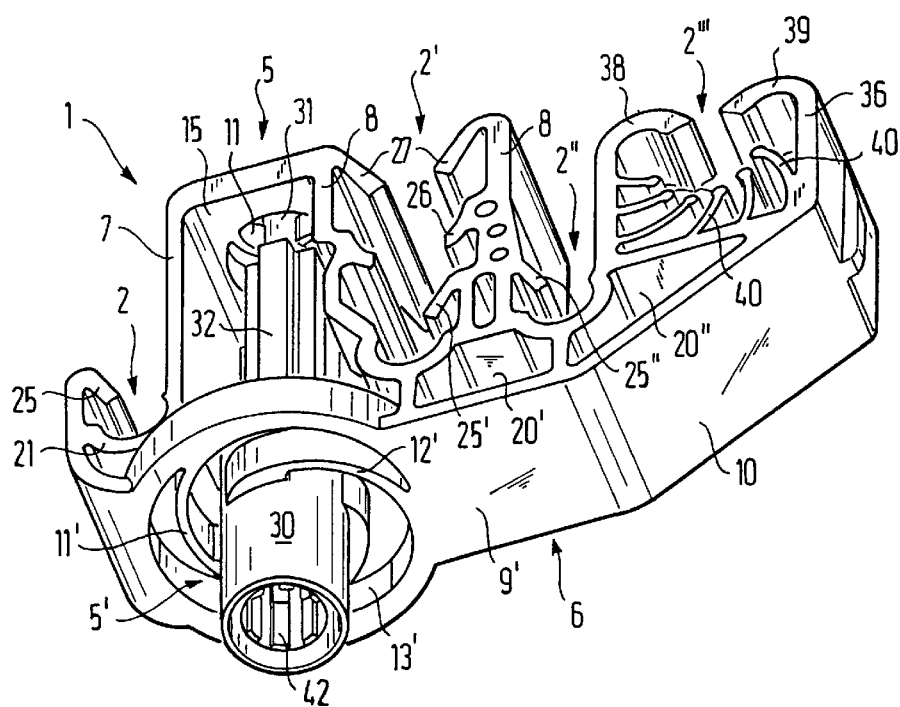
FIG. 5 is a perspective representation of the holding element of FIG. 1 showing the first side and taken from the bottom and back of the holding element.

It is especially apparent from FIGS. 1, 4, and 5 that the attachment area 3 is connected with a frame 6 via at least two elastic connection areas 5 and 5', arranged at a spaced axial distance from one another. The frame 6, according to FIG. 1, is designed in cross piece manner. It includes vertical cross-pieces 7, 8, 8', 35 and 36, arranged at a distance from each other, and also an arched cross-piece 9, a horizontal cross-piece 9' and a diagonally extending cross-piece 10.

It is evident from FIGS. 4 and 5, that the respective connection areas 5 and 5' comprise three elastic arms 11, 12, 13 spaced circumferentially about the attachment area 3. Similarly, in the lower area of frame 6 there are three elastic arms 11', 12', 13' that are also circumferentially spaced. This results in three-dimensional movement possibility between the attachment area 3 and the holding areas.

Figure 2:
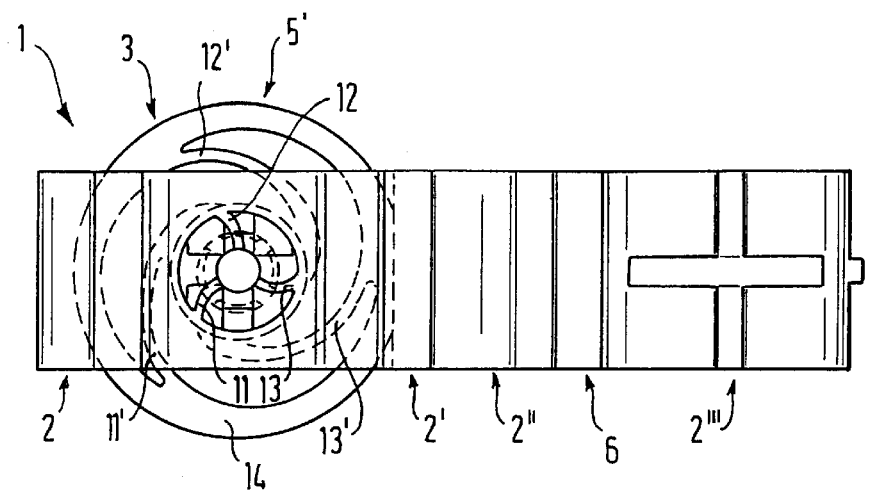
FIG. 2 is a top plan view of the holding element according to FIG. 1.

According to FIGS. 2 and 5, the lower end of frame 6 is designed to have an annular or ring form 14, whereas the upper end of frame 6 is designed as a rectangle 15. The reverse arrangement is also possible, as well as an arrangement of two rectangles and/or two rings for connection areas 5 and 5'.

Specifically, as seen in FIG. 1, ring 14 of frame 6 is joined by cross-pieces 9 and 9', above which are provided respective recesses 20 and 20'. These recesses respectively pass over into dish-shaped receptacles 21, 21', and 21", which serve for accepting the tube-shaped elements (not shown).

Figure 3:
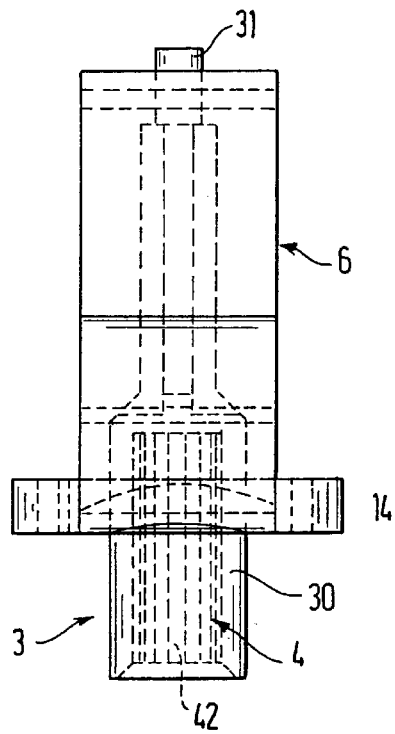
Figure 6:
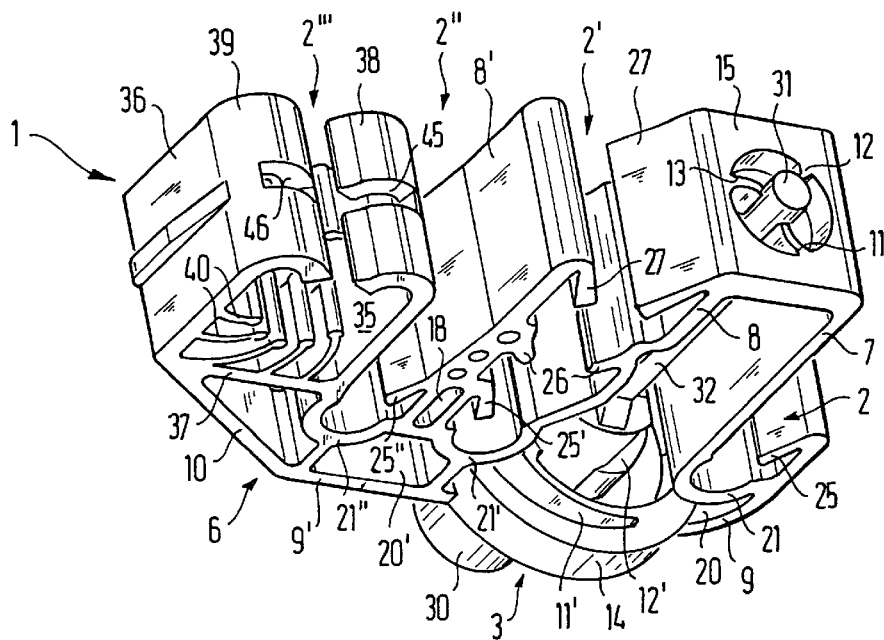
FIG. 6 is a perspective representation of the holding element of FIG. 1 showing a second side and taken from the the top and back of the holding element.

It is particularly evident from FIGS. 3 and 6, that the attachment area 3 has upper and lower cylindrical sections 30 and 31. These sections 30 and 31 are respectively connected via the spirally shaped elastic arms 11, 12, 13 and 11', 12', 13', with the rectangle 15 at the upper end of the frame and the ring 14 at the lower end of the frame.

Figure 7:
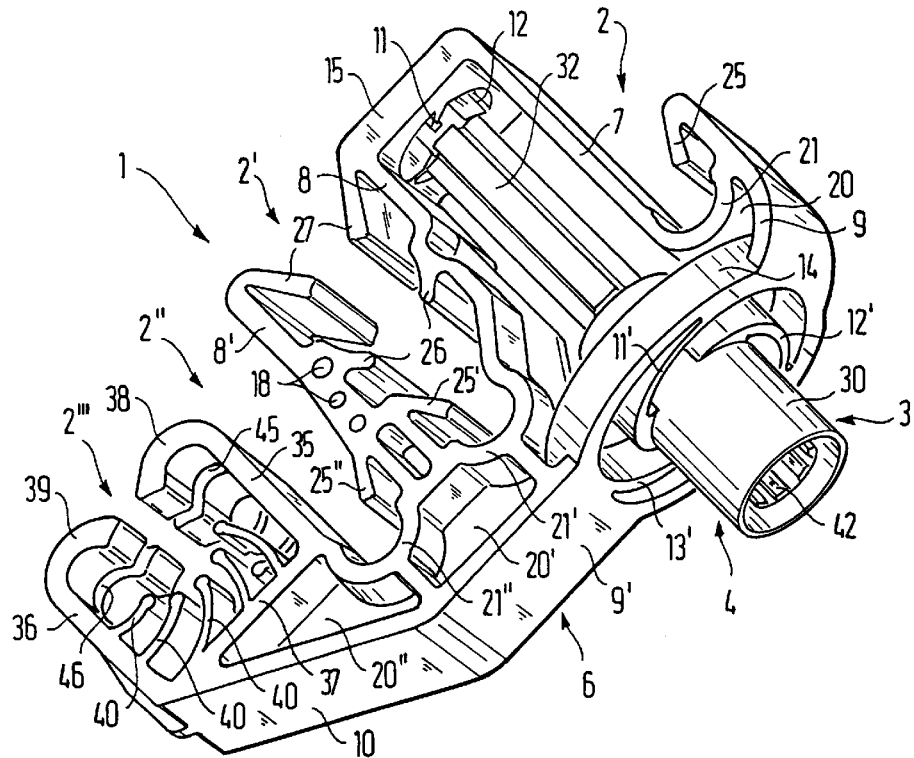
FIG. 7 is a perspective representation of the holding element of FIG. 1 showing the second side and taken from the bottom and back of the holding element.

In addition, it is apparent from FIGS. 1, 5 and 7 that the attachment area 3 has a polygonal section between the upper and the lower cylindrical section 30 and 31. For example, the cross-section of the polygonal section can be composed of four rectangular cross-pieces. The cross-section of the polygonal center section 32 can thereby be smaller than the diameter of the lower cylindrical section 30 of the storage area 3. Other design possibilities also exist with respect to the center section, for example it could comprise a piece of circular cross-section.

As is apparent from FIG. 1, the distance of ring 14 from the rectangle 15 can be greater than the length of the polygonal center section 32 in order to achieve as large a distance as possible between the connection areas 5 and 5'.

In accordance with FIGS. 1 and 4, the holding areas 2, 2', 2" above the dish-shaped receptacles 21, 21' and 21" have at least one holding cross-piece 25, 25' and 25" oriented to extend against the circumference of a tube-shaped element to be positioned therein. Furthermore, it is apparent from FIGS. 1 and 5, that the holding area 2" has, for example, several pairs of holding cross-pieces 26 and 27, arranged at spaced distances above each other. In this instance, the one part of the holding cross-piece pair 26 or 27 is respectively arranged at the vertical cross-piece 8 of the frame 6 and the other part is arranged at an additional vertical cross-piece 8' of frame 6. It is possible with this design that, for example, the holding area 2' can accept several cables and/or tube lines, even those having differing diameters, arranged one above the other. Thus, according to the invention, the cables or tubes are fastened with the aid of holding cross-piece 25' and the pairs of holding cross-pieces 26 and 27, perfectly and in a noise-attenuated manner in the holding element 1.

The additional cross-piece 8' can be provided, for example, with several openings or recesses 18 in order to contribute to both savings in material and/or weight, as well as to provide further noise attenuation.

It is apparent from FIGS. 1, 4 and 7 that there is arranged, above the recess 20", which is limited by the oblique cross-piece 10 of housing 6, another holding area 2'". The holding area 2'" is formed by three cross-pieces 35, 36, 37 of frame 6. These cross-pieces are arranged at right angles to each other. At the interior side of these cross-pieces there are arranged wings 40 that may extending spirally. Further, the wings 4 are designed to be flexible and may be thicker in their anterior or base area.

In addition, the two vertical cross-pieces 35 and 36 define upper insertion are 38 and 39 that area curved against each other. This results in easier installation of the tube-shaped elements to be arranged in the holding area 2'". In such an arrangement, the insertion areas 38 and 39 may respectively define a center slot 45 and 46.

As is apparent from FIGS. 1, 5 and 7, the attachment area 3 is of cylindrical design and has longitudinally extending holding cross-pieces 42 on its interior. These holding cross-pieces have the purpose of positioning themselves onto a profile bolt extending from the support. For example, the support can be the body of a motor vehicle. Thus, they guarantee perfect attachment of the fastening element to the body of the motor vehicle. It is, of course, possible for the attachment area 3 to be designed in other known forms, such as a profile bolt, a clip or as a holding element having a configuration designed for insertion into an opening of a support. Additionally, above the profile bolt or the clip or the holding element there may be arranged a circumferential sealing lip in order to obtain a sealing effect against the opening of the support.

Based on the special design of the holding element there is produced, due to the use of spirally-extending arms arranged at a distance from each other and the creation of a cross-piece-type frame, an extremely good damping effect with further improvement in tolerance compensation. Thus, this holding element according to the invention is particularly suitable for technical applications in motor vehicle.

Having thus described the invention, it is claimed:

1. A plastic holding element comprising:
   a frame having at least one dish-shaped holding area adapted to hold at least one tube-shaped element in the holding element, the frame further including a plurality of cross-pieces, at least one of the cross-pieces comprising part of the holding area;
   an elongate attachment area including engagement parts adapted to fasten the holding element to an operatively associated support member; and,
   at least two elastic arms extending from axially spaced apart opposite ends of the elongate attachment area for connecting the opposite ends of the elongate attachment area to the frame.

2. A holding element according to claim 1 wherein:
   said frame includes a pair of connection areas connecting said at least two elastic arms with the frame; and,
   at least a one of the plurality of cross-pieces adjoins a first one of the connection areas and extends adjacent the first connection area defining a recess forming said at least one dish-shaped receptacle of the holding area.

3. A holding element according to claim 1 wherein the frame includes a plurality of dish-shaped holding areas and a plurality of second holding areas located adjacent the plurality of dish-shaped holding areas, each of the plurality of second holding areas having at least one holding cross piece oriented to extend towards a center of the respective dish shaped holding area.

4. A holding element according to claim 3 wherein at least one of said plurality of second holding areas includes a plurality of pairs of holding cross-pieces arranged adjacent one another at spaced distances.

5. A holding element according to claim 11 wherein the frame includes first and second spaced apart vertical cross-pieces and wherein first and second portions of the holding cross-pieces are respectively disposed on said first and second vertical cross-pieces of the frame.

6. A holding element according to claim 5 wherein at least one of the vertical cross-pieces has an opening formed therein.

7. A holding element according to claim 1 further including a plurality of holding areas, wherein at least one of the plurality of holding areas defines an interior space having elastic wings protruding obliquely into the interior space.

8. A holding element according to claim 7 wherein the interior space is formed by three cross-pieces arranged to extend at right angles to each other and wherein said wings are disposed on interior sides of the three cross-pieces.

9. A holding element according to claim 8 wherein the three cross-pieces include two vertical cross-pieces arranged at a distance from each other, said two vertical cross-pieces including upper insertion areas which are curved toward each other.

10. A holding element according to claim 1 wherein the attachment area is adapted for insertion into an opening of a support.

11. A holding element according to claim 10 wherein the attachment area is adapted to sealingly engage said opening of said support.

12. A plastic holding element comprising:
- a frame having at least one dish-shaped holding area adapted to hold at least one tube-shaped element in the holding element, the frame further including a plurality of cross-pieces, at least one of the plurality of cross-pieces comprising part of the holding area;
- an elongate attachment area including engagement parts adapted to fasten the holding element to an operatively associated support member; and,
- at least two elastic connection areas connecting the frame with the attachment area, the elastic connection areas comprising at least two spirally extending elastic arms extending from axially spaced apart portions of said elongate attachment area.

13. A holding element according to claim 12 wherein each of said elastic connection areas comprise three elastic arms distributed circumferentially about the attachment area at each of the axially spaced apart portions of the attachment area.

14. A holding element according to claim 13 wherein at least one of the elastic connection areas is shaped in at least a one of a ring conformation and a rectangle conformation.

15. A plastic holding element comprising:
- a frame having at least one dish-shaped holding area adapted to hold at least one tube-shaped element in the holding element, the frame further including a plurality of cross-pieces, at least one of the plurality of cross-pieces comprising part of the holding area;
- an attachment area including engagement parts adapted to fasten the holding element to an operatively associated support member, the attachment area including an upper cylindrical section and a lower cylindrical section the upper and lower cylindrical sections being spaced apart axially on said attachment area;
- a first spirally-shaped, flexible arm connecting the upper cylindrical section with an upper end of said frame; and,
- a second spirally-shaped, flexible arm connecting the lower cylindrical section with a lower end of said frame.

16. A holding element according to claim 13 wherein said lower cylindrical section and said upper cylindrical section are spaced apart and joined by a center section of the attachment area having a one of a polygonal cross section and circular cross section.

17. A holding element according to claim 16 wherein the frame defines an upper end and a lower end, the upper and lower ends of said frame being spaced apart from each other by a distance greater than a length of the center section.

18. A holding element according to claim 16 wherein at least a one of the spaced apart lower and upper cylindrical sections of the attachment area includes internal longitudinally extending holding cross-pieces for engaging into said operatively associated support member.

19. A holding element according to claim 16 wherein the center section has a cross section smaller than a diameter of the lower cylindrical section.

20. A plastic holding element comprising:
- a frame having at least one dish-shaped holding area adapted to receive at least one tube-shaped element, the frame including cross-pieces with at least one cross-piece of the frame comprising part of a holding area, at least one of the holding areas defining an interior space and including elastic wings protruding obliquely into the interior space, the interior space being formed by three cross-pieces arranged to extend at right angles to each other, the wings being arranged on interior sides of the three cross-pieces, two of the three cross-pieces being vertical cross-pieces arranged at a distance from each other, said two vertical cross-pieces including upper insertion areas which are curved toward each other, the upper insertion areas defining a center slot;
- an attachment area with engagement parts adapted to fasten to a support; and,
- at least two elastic connection areas extending from axially spaced apart portions of said attachment area, the at least two connection areas connecting the frame with the attachment area.

21. A plastic holding element comprising:
- a frame having a plurality of cross pieces defining a plurality of holding areas, each of the plurality of holding areas being adapted to receive at least one operatively associated tube-shaped member;
- a substantially cylindrical attachment area adapted for connection to an associated support member to fasten the plastic holding element to the associated support member, the attachment area being movable relative to said frame and including an upper cylindrical section and a lower cylindrical section; and,
- a plurality of flexible radially extending connection areas connecting said attachment area with said frame, the plurality of connection areas extending from axially spaced apart opposite portions of said cylindrical attachment area and including at least one first elastic arm connecting the upper cylindrical section to said frame and at least one second elastic arm connecting the lower cylindrical section to said frame.

22. The plastic holding element according to claim 21 wherein said plurality of flexible connection areas include a pair of axially spaced apart spirally extending elastic connection areas disposed on opposite ends of the cylindrical attachment area.

23. The plastic holding element according to claim 21 wherein at least one of said plurality of holding areas includes two vertical cross pieces having upper insertion areas which are curved toward each other, the upper insertion areas defining a center slot.

24. The plastic holding element according to claim 21 wherein said plurality of flexible connection areas include at least two spirally extending elastic arms.

25. The plastic holding element according to claim 21 wherein said plurality of flexible connection areas are adapted to provide a damping effect.

26. The plastic holding element according to claim 21 wherein said attachment area includes a plurality of longitudinally extending cross-pieces formed on an interior thereof.

27. The plastic holding element according to claim 21 wherein:
- said at least one first elastic arm includes at least one spirally extending first elastic arm; and,
- said at least one second elastic arm includes at least one spirally extending second elastic arm.

* * * * *